United States Patent [19]
Sarangdhar et al.

[11] Patent Number: 6,009,477
[45] Date of Patent: *Dec. 28, 1999

[54] BUS AGENT PROVIDING DYNAMIC PIPELINE DEPTH CONTROL

[75] Inventors: Nitin Sarangdhar; Michael Rhodehamel; Matthew Fisch, all of Beaverton, Oreg.

[73] Assignee: Intel Corporation, Santa Clara, Calif.

[ * ] Notice: This patent is subject to a terminal disclaimer.

[21] Appl. No.: 09/213,098

[22] Filed: Dec. 17, 1998

Related U.S. Application Data

[63] Continuation of application No. 08/979,740, Nov. 26, 1997, abandoned, which is a continuation of application No. 08/871,593, Jun. 6, 1997, Pat. No. 5,761,449, which is a continuation of application No. 08/645,836, May 14, 1996, abandoned, which is a continuation of application No. 08/206,093, Mar. 1, 1994, Pat. No. 5,548,733.

[51] Int. Cl.⁶ .................................................... G06F 3/00
[52] U.S. Cl. .............................. 710/1; 709/100; 709/105; 710/105
[58] Field of Search ................................. 395/670, 675, 395/285, 736, 280; 370/468; 709/100, 102, 105, 300; 710/100, 105, 263, 1, 112; 712/220

[56] References Cited

U.S. PATENT DOCUMENTS

| | | | |
|---|---|---|---|
| 4,480,307 | 10/1984 | Budde et al. ........................... | 395/280 |
| 5,006,982 | 4/1991 | Ebersole et al. ....................... | 395/736 |
| 5,313,467 | 5/1994 | Varghese et al. ...................... | 370/468 |
| 5,384,737 | 1/1995 | Childs et al. ....................... | 365/189.05 |
| 5,568,620 | 10/1996 | Sarangdhar et al. .................... | 395/285 |

*Primary Examiner*—Gopal C. Ray
*Attorney, Agent, or Firm*—Blakely, Sokoloff, Taylor & Zafman LLP

[57] ABSTRACT

Each of a plurality of device or agents connected to a computer system bus is provided with a mechanism for unilaterally and dynamically limiting the depth of a pipeline of the bus. Each agent includes a state machine which indicates whether the bus is in a throttled state, a stalled state or a free state. When in a free state, an agent having control of the bus may transmit any number of bus transactions and the depth of the pipeline may therefore increase. In the throttled state, the agent may transmit only a single bus transaction from the throttled state, the state machine always transitions either to the stalled state or to the free state. In the stalled state, no agents may transmit transactions onto the bus and the depth of the pipeline therefore cannot increase and instead may decrease with time as previously issued transactions are drained from the bus. Wired-OR logic is employed for allowing an agent to transmit a state transition signal to all other agents on the bus changing the state of the various state machines only a single state transition signal is required to completely control the state of the state machines. By employing wired-OR logic, any particular agent is capable of switching the state machines into a stalled state to prevent new bus transactions from being issued to the bus. In this manner, each agent is capable of unilaterally restricting or limiting the depth of the pipeline. Hardware or software is provided within each agent to control the state machine in a manner such that all state machines remain synchronized with each indicating the same state at substantially the same time.

3 Claims, 5 Drawing Sheets

Figure 5 ns a signal to the central arbiter that specifies the maximum pipeline depth that the agent can accommodate. The arbiter then controls the depth of the pipeline in accordance with the signals received from each of the various bus agents. Although such a system is feasible, it is not necessarily an ideal system since the need for each agent to transmit signals to a central arbiter renders the responsiveness to changing pipeline depth requirements somewhat sluggish and may result in circumstances where multiple bus transactions are issued before the central arbiter has a chance to recognize and respond to a pipeline depth reduction request received from one of the agents. Such may necessitate re-transmission of bus transactions, resulting in overall bus inefficiency or, under certain circumstances, could result in the loss of data. In any case, it would be desirable to provide a more effective method for dynamically controlling the depth of the bus pipeline.

BUS AGENT PROVIDING DYNAMIC PIPELINE DEPTH CONTROL

The present U.S. patent application is a continuation of Application Ser. No. 08/979,740, filed Nov. 26, 1997 now abandoned, which is a continuation of Application Ser. No. 08/871,593, filed Jun. 6, 1997, now U.S. Pat. No. 5,761,449, which is a continuation of Application Ser. No. 08/645,836, filed May 14, 1996, now abandoned, which is a continuation of Application Ser. No. 08/206,093, filed Mar. 1, 1994, now U.S. Pat. No. 5,548,733.

RELATED APPLICATIONS

This application is related to U.S. patent application Ser. No. 08/206,091 entitled, "Method and Apparatus for Transmitting Information on a Wired-OR Bus", filed Mar. 1, 1994, U.S. Pat. No. 5,548,733 which is incorporated by reference herein (Attorney Docket No. 42390.P2146).

BACKGROUND OF THE INVENTION

1. Field of the Invention

The invention generally relates to computer systems and in particular relates to pipelined bus systems for use in interconnecting devices within a computer system.

2. Description of Related Art

Many state of the art bus systems are pipelined to allow for multiple bus transactions to be processed concurrently. For example, bus arbitration may be performed for one transaction while data transfer is performed concurrently for a separate bus transaction. In this manner, although only a single phase of a single bus transaction can be processed at any given clock cycle, multiple transactions can nevertheless be processed in parallel with different phases of the separate bus transactions performed concurrently.

A problem can occur with pipelined busses if each of the devices or agents, connected to the bus is not capable of accommodating the maximum depth of the bus pipeline. For example, if one particular agent is only capable of accommodating a pipeline having a depth of two, then the overall bus system may not function properly if other agents are attempting to pipeline transactions up to a greater pipeline depth. The effective maximum depth for a bus pipeline is constrained by the agent which can accommodate only the shallowest bus pipeline depth. The bus depth to which any particular agent is capable of accommodating may depend on the particular hardware of the bus agent or it may depend upon the current state of the bus agent. For example, during start-up or initialztion of an agent, the agent may not be capable of processing any bus transactions, whereas once the agent has been fully activated, the agent may be capable of accommodating a bus pipeline depth of five. In other cases, the maximum depth to which an agent can process bus request is a dynamic function of the current state of input and output queues connected to the bus. For example, if the input queue of a bus agent is empty, the agent may be capable of accommodating a pipeline depth of five. However, if the queue of the bus agent is full or nearly full, the agent may only be capable of accommodating a bus pipeline depth of one or two.

It would be desirable to provide a bus mechanism to allow the overall depth of the bus pipeline to be dynamically varied in accordance with any particular constraints of the agents connected to the bus. One proposed solution is to provide a central arbiter which controls the depth of the pipeline. In such a system, each individual bus agent trans-

SUMMARY OF THE INVENTION

A method and apparatus is provided for dynamically controlling the depth of a bus pipeline. In accordance with one aspect of the invention, an improvement is provided within a computer system having a system bus interconnecting a plurality of bus agents with the system having means for pipelining transactions on the bus up to a maximum predetermined pipeline depth. The improvement comprises providing means, within each of a plurality of agents connected to the bus, to allow each agent to dynamically and unilaterally limit the depth of the pipeline of the bus. The pipeline depth control means, provided within each agent, preferably includes a transmitter means for transmitting a signal through the bus to all other agents on the bus for restricting further bus transactions and a receiver means for receiving signals from the other agents through the bus indicating that one of the other agents is restricting further bus transactions. Preferably, each agent connected to the bus also includes a means for tracking the current pipeline depth of the bus, such that the appropriate signals may be transmitted to the other bus agents restricting further bus transactions in the event the current bus pipeline depth meets the current capability of the particular agent.

Hence, each agent includes a means for transmitting a signal to restrict the further issuance of additional bus transactions thereby limiting the depth of the pipeline of the bus. Each other agent on the bus receives the signal and automatically responds thereto. In this manner, each agent is capable of unilaterally limiting the depth of the bus pipeline. Thus, a bus pipeline depth arbiter is not required.

In a preferred embodiment, each agent connected to the bus includes a state machine for tracking a state of the bus with the state identifying whether additional bus transactions are being restricted by any of the bus agents. The state of the bus is either free, stalled or throttled. When the state machine is in the free state, any number of bus transactions can be transmitted onto the bus and the pipeline depth can increase to its maximum allowable depth. When the state machine is in the stalled state, no new bus transactions can be transmitted onto the bus and the depth of the pipeline therefor decreases with time as bus transactions already on the bus are processed and ultimately "drained" from the bus. When the state machine is in the throttled state, only a single new bus transaction can be transmitted onto the bus and the depth of the pipeline of the bus is effectively maintained at a constant level. The signals transmitted by the transmitter means of the bus agents are herein referred to as state transition signals. A bus agent seeking to issue a bus transaction first accesses the state machine maintained within the agent to determine whether additional bus transactions are permissible. Then, the bus transaction is issued only if the state machine is in the free or throttled state.

A particularly desirable feature of the state machine is that the state machine is controlled by only a single state transition signal. If the state transition signal is sampled active, then the state machine switches to the stalled state regardless of its previous state. If the state transition signal is sampled inactive, then the state machine transitions from stalled to throttled, from throttled to free or from free to free, depending upon the previous state. By utilizing only a single state transition signal, which is either active or inactive, several advantages result, including the advantage of relatively simple hardware.

The bus preferably includes a single signal connection line for transmitting the state transition signals between agents. The state transition signal is represented by an assertion of the signal line. Wired-OR logic is employed to allow each of the agents on the bus to assert the signal line causing the appropriate transition in all state machines connected to the bus with the transitions occurring substantially simultaneously. By employing wired-OR logic, several agents can simultaneously transmit the state transition signal without conflict.

Method and apparatus embodiments of the invention are provided. The various method and apparatus embodiments of the invention may be advantageously implemented within any of a variety of pipelined bus systems. However, the invention is preferably implemented within a multiprocessor architecture.

Thus, the broad objective of providing an improved method for dynamically controlling the depth of a pipeline of a bus is achieved. Other objects and advantages of the invention will be set forth below or will be apparent from the descriptions provided herein.

DETAILED DESCRIPTION OF PREFERRED EMBODIMENTS

Referring to FIGS. 1–5, preferred embodiments of the invention will now be described. Within these descriptions, certain specific details of exemplary embodiments of the invention will be set forth. However, in many cases, embodiments may be configured without the specific details in accordance with the principles of the invention.

Figure 1:
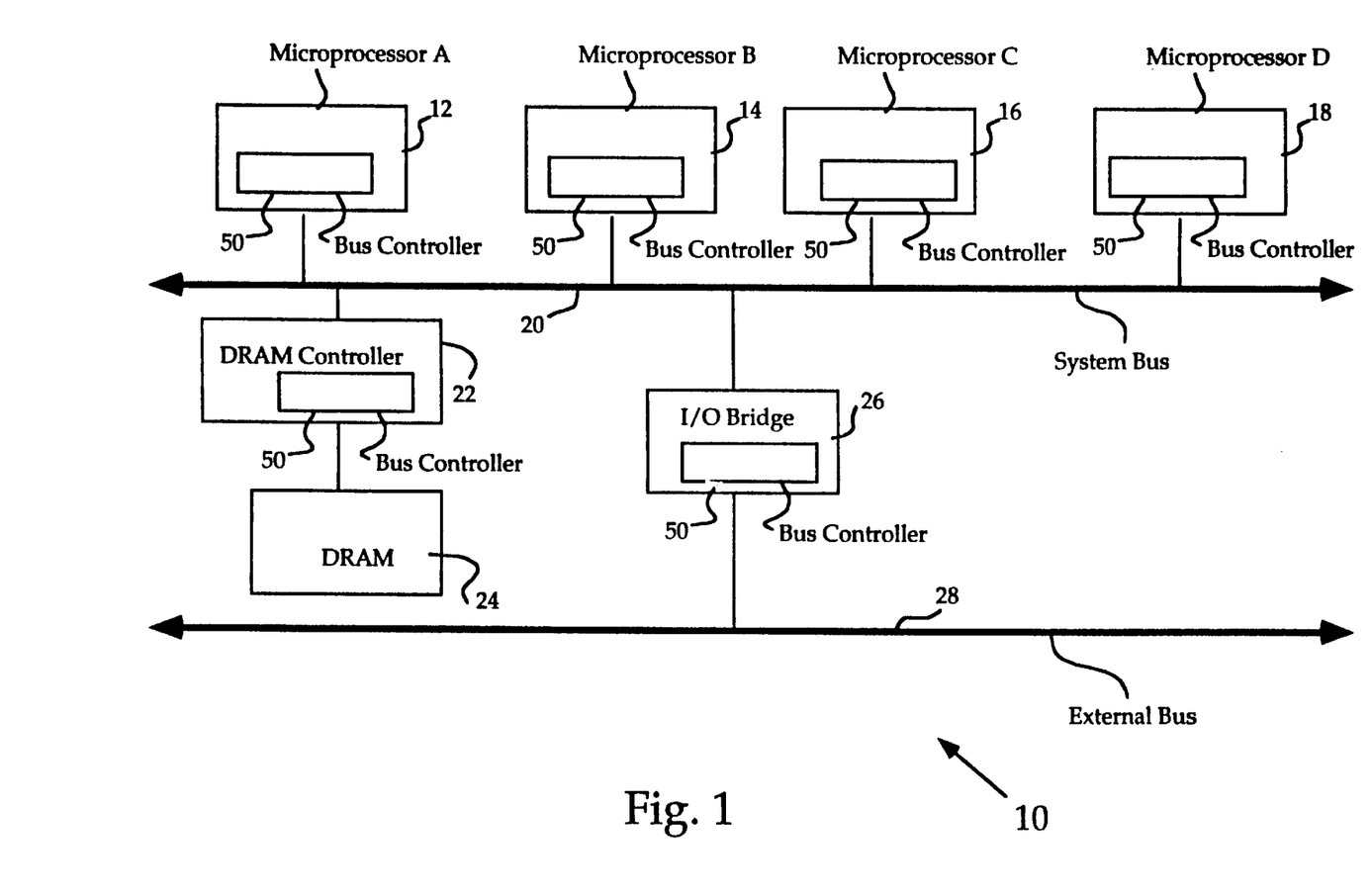
FIG. 1 is a block diagram of a computer system having a pipelined bus.

FIG. 1 illustrates a block diagram of a computer system configured in accordance with principles of the invention. Computer system 10 includes a set of four microprocessors 12,14,16 and 18, each connected to a system or CPU bus 20. Additional devices are also connected to the system bus including a DRAM controller 22 which is in turn connected to a DRAM 24. An I/O bridge 26 is also connected to system bus 20. I/O bridge 26 interconnects system bus 20 to an external bus 28 which may be, for example, an EISA bus. Peripheral devices (not shown), such as printers, modems, and the like, may be connected via external bus 28.

Each of microprocessors 12–18, DRAM controller 22, and I/O bridge 26 represents a bus agent connected to system bus 20. Additional bus agents, not shown, may also be connected to system bus 20. In one embodiment, a total of eight agents may be simultaneously connected to system bus 20. The total number of agents connectable to system bus 20 depends, for example, upon the electrical characteristics of the system bus. In other embodiments, more or fewer bus agents may be connectable directly to system bus 20. Each of microprocessors 12–18 may be identical or, depending upon the implementation, the various microprocessors may differ. In one implementation, each microprocessor is a complex instruction set (CISC) microprocessor configured in accordance with Intel Architecture. In other embodiments, the microprocessors may be reduced instruction set (RISC) microprocessors. In other implementations, only a single microprocessor may be connected to system bus 20.

Each agent includes a bus controller 50 (described below with reference to FIG. 3.) Each bus controller is identical to bus controllers within each other agent or, at least, is configured to perform a minimum set of identical functions of the bus controllers of every other agent. Bus 20 and the various bus controllers within each bus agent collectively provide a pipelined bus system, wherein multiple bus transactions are processed simultaneously.

Figure 2:
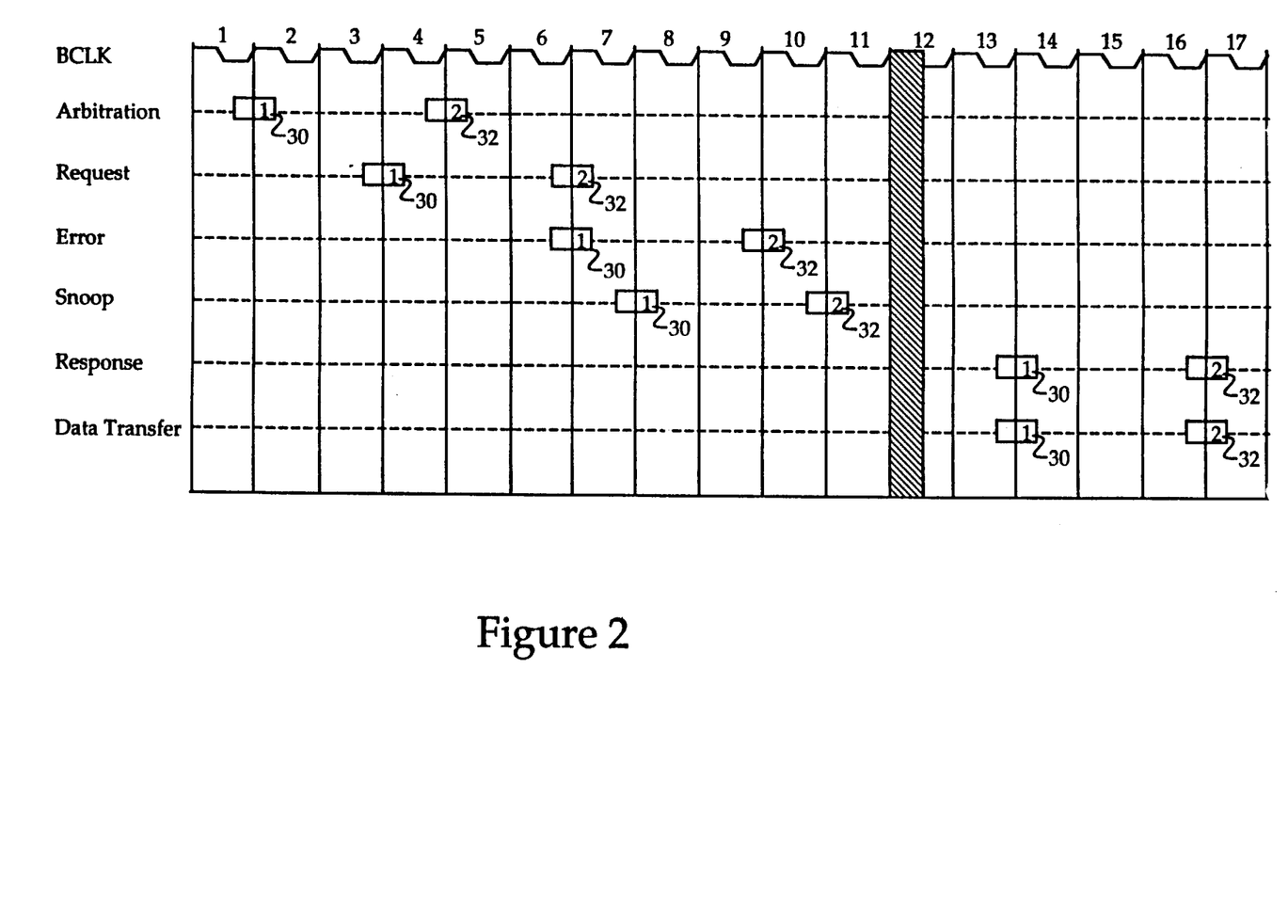
FIG. 2 is a timing diagram illustrating an exemplary bus pipeline.

FIG. 2 illustrates an exemplary bus pipeline. BCLK represents a bus clock with a total of seventeen clock cycles illustrated. Exemplary bus transactions 30 and 32 are also illustrated. Bus transactions 30 and 32 each include the following distinct bus phases: an arbitration phase, a request phase, an error phase, a snoop phase, a response phase, and a data transfer phase. Arbitration represents a phase wherein it is determined which of the bus agents can gain control of the bus. Any of the agents connected to system bus 20 may be configured as a bus arbitrator. The manner by which bus arbitration is performed is not pertinent to the invention and will not be described in detail herein. The request phase represents a phase in which a request, such as a memory load, is processed on the bus. The error phase represents a phase wherein any error occurring as a result of the bus request is processed. The snoop phase represents a phase wherein data caches within the various microprocessors illustrated in FIG. 1 are snooped to determine, for example, whether any contents of the respective caches are relevant to the transaction being snooped. The response and data transfer phases are phases in which the bus transaction is satisfied, for example, by having data retrieved from memory transmitted to an agent requesting the data.

The various phases of bus transactions 30 and 32 are performed at different clock cycles. For example, the arbitration phase for transaction 30 is performed at the end of clock cycle 1. The request phase for transaction 30 is performed at the end of clock cycle 3. The error phase, the snoop phase, and the response and data transfer phases are performed at the ends of clock cycles 6,7,13 and 13, respectively. In FIG. 2, the band between clock cycles 11 and 12 indicates that an arbitrary number of additional clock cycles may occur before subsequent phases are executed. In other words, depending upon the particular bus transaction, there may be numerous clock cycles before the response and data transfer phases are performed. The exact number may depend upon, for example, the speed by which RAM 24 (FIG. 1) can respond to a memory load to retrieve requested data.

Hence, the separate phases of the single bus transaction are performed sequentially in time at different clock cycles. The discrete phases of bus transaction 32 are also performed sequentially at different clock cycles, each of which is staggered in time from the corresponding phase of bus transaction 30. In the example of FIG. 2, at least three clock cycles must occur between the arbitration phase for bus transaction 30 and the arbitration phase for bus transaction 32. Other pipeline implementations may have a greater or lesser number of clock cycles between each successive phase. Numerous additional bus transactions may also be performed with, for example, the arbitration phase for a third bus transaction occurring at the end of clock cycle 7 and the arbitration phase for yet another bus transaction occurring at the end of clock cycle 10.

In general, only a single phase of any one bus transaction may be performed at each clock cycle. However, at a particular clock cycle, different phases of different transactions may be performed simultaneously. For example, at clock cycle seven, both the request phase of bus transaction 32 and the error phase of bus transaction 30 are performed simultaneously. As can be appreciated, up to eight bus transactions may be performed simultaneously, each with a different phase or no phase being processed in any given clock cycle.

Thus, FIG. 2 illustrates an exemplary pipeline for use with system bus 20. The exemplary pipeline has a maximum depth eight. As will be discussed below, a mechanism is provided for allowing any of the agents connected to system bus 20 to limit the depth of the bus to prevent more than, for example, four transactions to be processed simultaneously.

Figure 3:
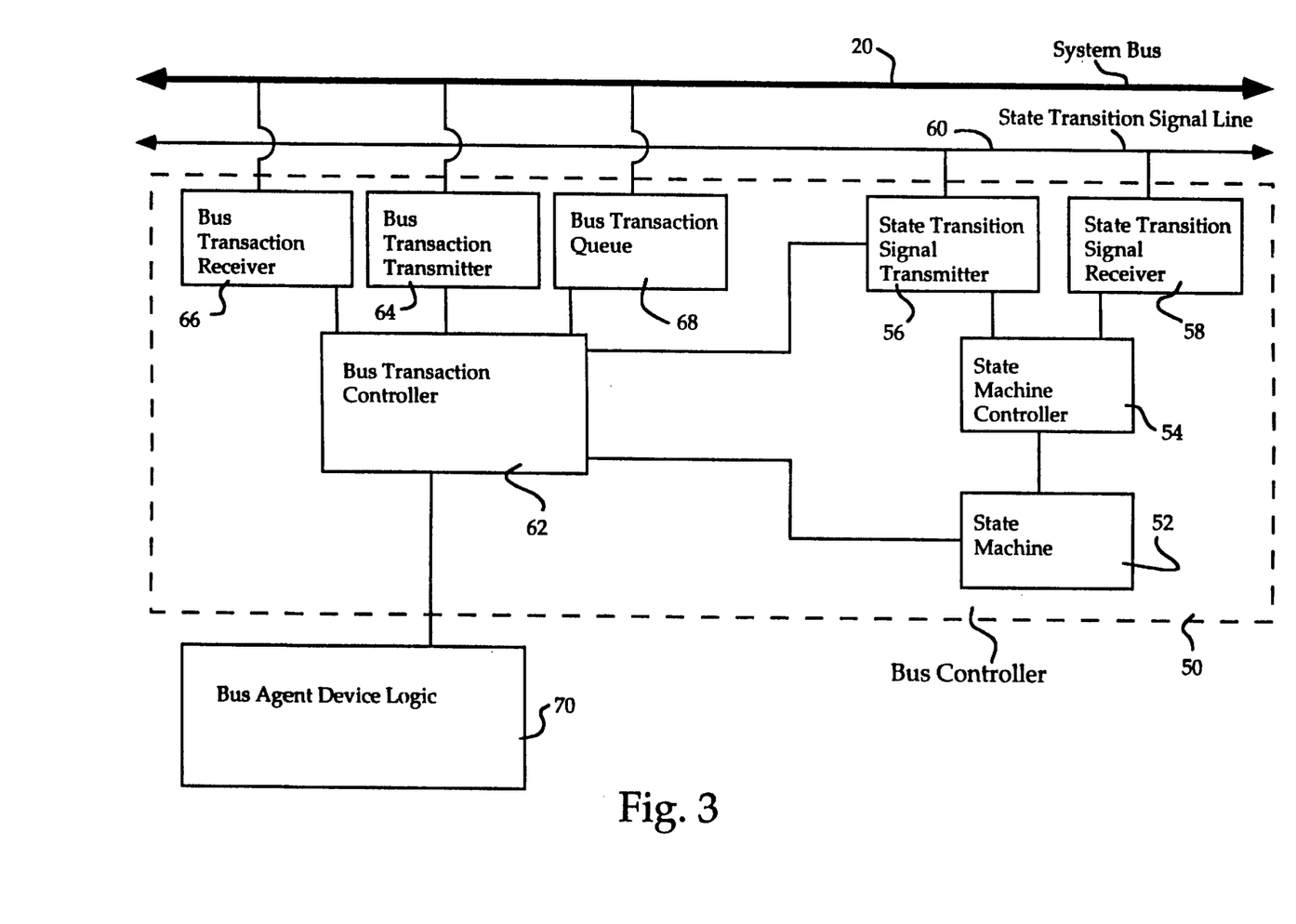
FIG. 3 is a block diagram of one agent connected to the bus of FIG. 1, particularly illustrating functional units provided within the agent for allowing the agent to dynamically control the depth of the bus pipeline.

FIG. 3 illustrates a bus controller 50 within one of the bus agents illustrated in FIG. 1. Each of the agents includes a bus controller performing at least the functions illustrated in FIG. 3. Each individual bus controller may be configured using different hardware so long as the same set of minimum functions are performed.

Before discussing the particular functions of the bus controller of FIG. 3, a brief overview of the operation of the bus controller is provided. As noted above, an important aspect of the invention is the provision of a mechanism for allowing each agent connected to a bus to unilaterally and dynamically limit the depth of the pipeline of the bus. This is achieved, in part, by providing a state machine in each agent connected to the bus which uniformly and concurrently tracks the state of the bus. There are three states to the bus including a free state, a stalled state, and a throttled state. In the free state, the depth of the pipeline of the bus is allowed to increase and any agent having control of the bus can dispatch as many bus transactions onto the bus as desired, up to a maximum predetermined bus depth, which, for the exemplary embodiment described herein, is eight. In the stalled state, the depth of the pipeline of the bus is allowed to decrease and the agent or agents having control of the bus are not permitted to transmit bus transactions onto the bus. In the stalled state, the depth of the pipeline of the bus decreases with time as transactions that had already been transmitted on the bus are completed and are "drained" from the bus. In the throttled state, one bus transaction may be issued, then the state machine immediately transitions to either the free state or the stalled state. The throttled state may be used to generally maintain the pipeline of the bus at a constant depth. Such may be achieved, for example, by repeatedly returning the state machine to the throttled state each time the state machine transitions from throttled back to free or stalled. However, the throttled state may be exploited for other purposes as well and, even if the state machine is repeatedly returned to the throttled state, the overall depth of the pipeline may increase or decrease somewhat.

Thus, the state of the bus indicates whether the agent having control of the bus can transmit transactions onto the bus. All agents connected to the bus have a similar state machine. The state machines are maintained in synchronization such that each state machine identifies the same state at substantially the same time. Accordingly, each agent is constrained to the same bus transaction limitations. It should be noted that the limitations imposed by the state machines are in addition to limitations imposed by a bus arbitration system which grants control of the bus to the bus agents. Thus, the fact that the bus may be in the free state does not grant each and every agent the power to transmit bus transactions. Rather, only that agent, or those agents, which have already gained control of the bus via arbitration are allowed to transmit transactions onto the bus and only if the bus is in the free or throttled state. The manner by which arbitration is achieved may be performed in accordance with conventional techniques and those techniques will not be described herein.

The state of the bus is controlled or influenced by each agent by transmitting state transition signals to all other agents through the system bus. As will be described in more detail below, the state transitions are defined, and the state transition signals are implemented, such that any one agent can switch the state machines to the stalled state from any other state to thereby limit further bus transactions. In this manner, each agent is capable of unilaterally switching the bus to the stalled state. The details of the state machine and the state transition signals will now be described with reference to the particular functional units illustrated in FIG. 3.

Within bus controller 50 of FIG. 3, the state of the bus is tracked by a state machine 52. The state machine indicates whether the bus is in the free state, the throttled state or the stalled state. A state machine controller 54 controls state machine 52 to cause the state machine to transition from one state to another based on the receipt or transmission of a state transition signal along bus 20. More specifically, a state transition signal transmitter 56 and a state transition signal receiver 58 are provided, each of which is connected to a state transition signal line 60 which forms a portion of system bus 20 within FIG. 3. For clarity, signal line 60 is shown separately from all other lines within system bus 20. However, signal line 60 may be regarded as merely one line of the overall system bus.

Transmitter 56 is controlled to transmit a state transmission signal on line 60 which is received by all agents connected to the bus by the respective state transition signal receivers provided within those agents. State machine controller 54 controls the state provided within state machine 52 in response to state transition signals received through receiver 58 and in response to signals transmitted via transmitter 56.

Each agent includes a corresponding receiver 58, a transmitter 56, controller 54, and state machine 52 configured to perform the same functions and respond to the same signals. Accordingly, each state machine indicates the same state—free, stalled, or throttled—at the same time.

Bus controller 50 also includes a bus transaction controller 62, a bus transaction transmitter 64, a bus transaction receiver 66, and a bus transaction queue 68. Bus transaction receiver 66 receives information regarding bus transactions pending on bus 20. The information is processed by transaction controller 62 and stored within a transaction queue 68. The information stored within transaction queue 68 effectively defines the current depth of the pipeline of bus 20. Bus transaction controller 62 monitors queue 68 and determines if the depth of the pipeline is reaching a depth which may exceed a currently permissible depth for the particular agent. If such is the case, transaction controller 62 queries state machine 52 to determine the current state of the bus and then controls signal transmitter 56 to transmit a state transmission signal, if needed, to switch the bus to a different state. For example, if transaction controller 62 determines that the pipeline depth is in danger of exceeding the agent's current capacity and that the depth must be prevented from increasing, controller 62 controls signal transmitter 56 to transmit a signal causing the state machines to transition to the stalled state thereby preventing further bus transactions from being issued to the bus and ultimately resulting in a decrease in the depth of the pipeline as previously issued transactions are completed.

A determination of whether the pipeline has met a maximum permissible depth for the particular agent is made by transaction controller 62 based on information received from internal device logic 70 of the agent. Such may occur as a result of internal queues within device logic 70 becoming full or as a result of device logic 70 switching to a state, such as a power-up state, wherein input bus transactions cannot be processed.

In the event that the particular agent illustrated in FIG. 3 has control of the bus and wishes to transmit a bus transaction via transaction transmitter 64, transaction controller 62 queries the states of state machine 52 to determine the current state. If the current state is stalled, then transaction controller 62 controls transmitter 64 to prevent a transaction from being transmitted onto bus 20. If the state machine is in the free state or the throttled state, then transaction controller controls transaction transmitter 64 to transmit a bus transaction. Transactions are transmitted by transmitter 64 only if the agent has current control of the bus as a result of previous arbitration.

Figure 4:
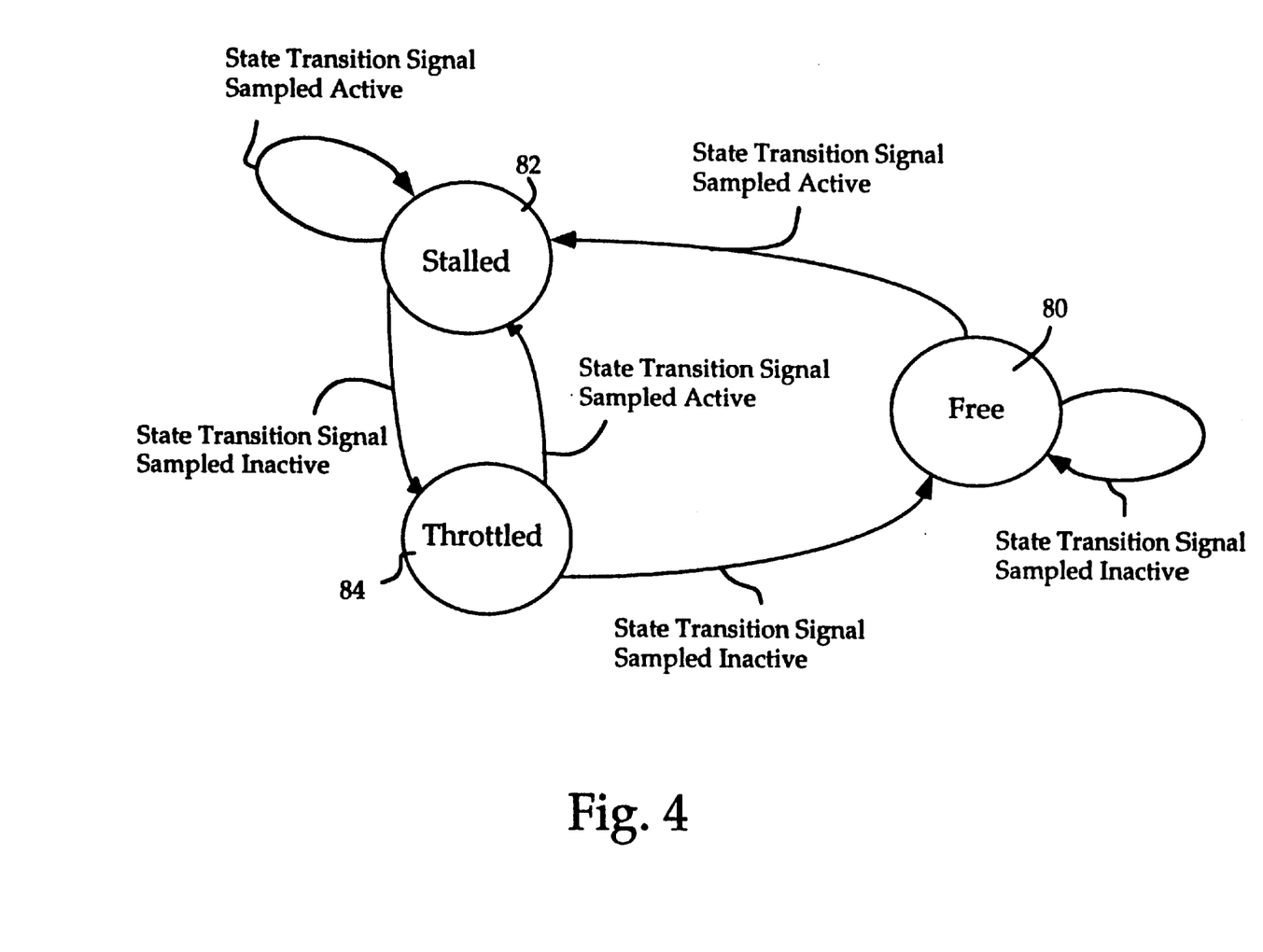
FIG. 4 is a state diagram illustrating the state transitions occurring within a state machine provided within the bus agent of FIG. 3.

Referring to FIG. 4, the particular state transitions between the free, stalled and throttled states will now be described. In FIG. 4, the free, stalled and throttled states are identified by reference numerals 80, 82 and 84, respectively. When in the free state, a transition may be made either to the stalled state or back to the free state. When in the stalled state, a transition may be made either to the throttled state or back to the stalled state. When in the throttled state, a transition may be made either to the free state or to the stalled state, but not back to the throttled state.

Whether a transition occurs depends upon whether a state transition signal is active or inactive. In FIG. 4, the state transitions are each labeled to identify whether the transition occurs as a result of an active state transition signal or an inactive state transition signal. If the state machine is in the free state, a transition occurs to the stalled state only if the state transition signal is active. If the state transition signal is inactive, the state machine remains in the free state. If an active state transition signal is received while in the stalled state, then the state machine remains in the stalled state, otherwise a transition is made to the throttled state. Finally, if an active transition signal is received in the throttled state, a transition occurs to the stalled state with a transition to the free state occurring otherwise. The system preferably employs a wired-OR logic with a low signal level representing an active signal and a high signal representing an inactive signal, such that each agent can unilaterally force an active low signal onto the signal transition line forcing the bus into the stalled state.

Thus, if no active signal is received, the free state remains free, the stalled state transitions to the throttled state, and the throttled state transitions to the free state. These transitions represent the default transitions. The default transitions are overcome only if one of the agents connected to the bus transmits an active state transition signal.

As a result of the logic defined by the state machine, any agent connected to the bus can cause a transition to the stalled state by asserting an active transition signal. The other possible state transitions occur only if none of the agents transmit an active transition signal. Hence, the transitions from the stalled state to the throttled state, from the throttled state to the free state, and from the free state back to the free state, can occur only if none of the agents assert an active transition signal.

From FIG. 4 it can also be appreciated that there are certain "forbidden" transitions. For example, a transition may not be made directly from the free state to the throttled state. Rather, a transition must first be made from free to stalled then from stalled to throttled. Likewise, a transition may not be made directly from the stalled state to the free state. Rather, transition must be made from stalled to throttled then from throttled to free.

In other implementations, it may be desirable to provide a state machine which allows for one or more of those forbidden transitions. However, for the exemplary implementation described herein, the state machine of FIG. 4 is suitable. One advantage of the state machine of FIG. 4 is that only a single signal, which may be either active or inactive, is sufficient to accommodate all allowed state transitions. If it were desirable to allow for additional transitions, a second signal may be required, perhaps necessitating a second signal line and additional hardware.

Having described the state machine illustrated in FIG. 4, aspects of the operation of bus controller 50 of FIG. 3 may now be further explained. If transaction controller 62 determines that the bus must be stalled, transaction controller 62 controls signal transmitter 56 to assert an active state transition signal. The foregoing is sufficient since any active signal will result in the state machines transitioning to the stalled state, regardless of the previous state. As another example, if transaction controller 62 determines that the state of the bus should be switched from the free state to the throttled state, signal transmitter 56 is controlled to transmit two successive active transition signals, causing the state machines to first transition from free to stalled, then from stalled to throttled.

Figure 5:
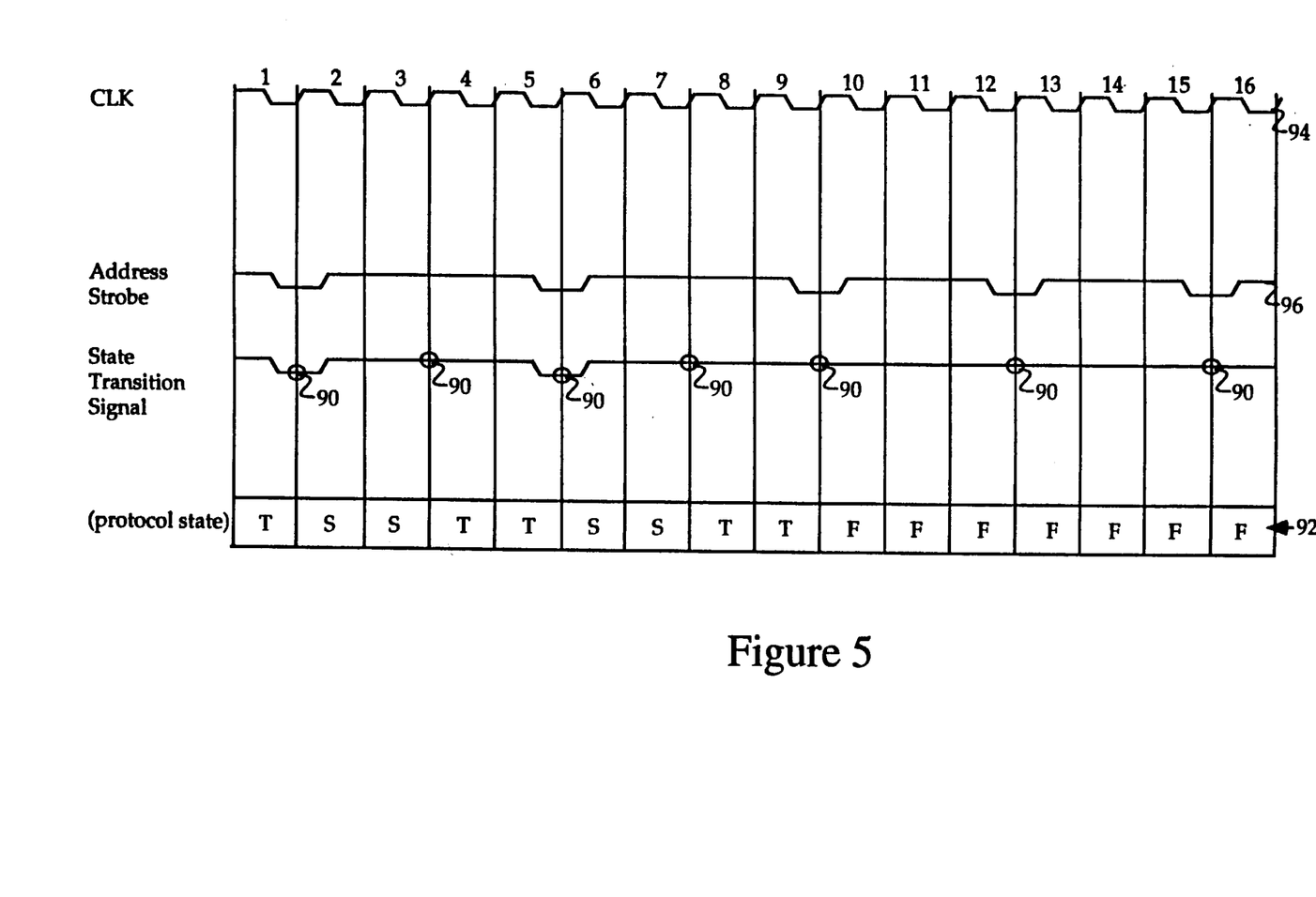
FIG. 5 is a timing diagram illustrating an exemplary sequence of state machine transitions for the state machine of FIG. 4.

FIG. 5 illustrates a timing diagram of an exemplary sequence of state transitions. Circles 90 identify sampling points wherein the state transition signal is sampled. As can seen, sampling does not necessarily occur at every clock cycle, but can occur at every second or third clock cycle. The state of the bus at each clock cycle is illustrated by sequence 92. State transitions occur only after sampling points 90. In other words, a state transition does not necessarily occur at each clock cycle. In the example illustrated, the state machine begins in the throttled state, then is switched to the stalled state as a result of the transition signal being sampled as active at the end of clock cycle 1. A second state transition occurs, back to the throttled state, after a sampling point at the end of clock cycle 3. A third state transition occurs, back the stalled state after a sampling point occurring at the end of clock cycle 5. Other state transitions are illustrated.

As noted, in the currently preferred implementation the number of clock cycles between each sampling point is either two or three. The duration between sampling points has been selected to eliminate a wire-OR glitch problem which can occur in transmission systems employing wired-OR logic. The details of the selection of the sampling points are provided in the co-pending application identified above. However, it should be noted that those details are not pertinent to the present invention, and a wide variety of implementations may be developed using different criteria for the sampling points. Indeed, if some other form of logic, rather than wired-OR logic is employed, then a different granularity of sampling points may be necessary or desirable. In certain implementations it may be desirable to sample the state transition signal at each clock cycle. However, in the exemplary implementation, since new bus transactions can only be output at least three clock cycles apart, the sampling of the transition signals at every two or three clock cycles is sufficient to adequately sample the state of the system and to control the depth of the pipeline.

In FIG. 5, the clock signal is identified by reference numeral 94 and an address strobe signal, which is also an active low signal, is illustrated by reference numeral 96. The address strobe signal illustrates the assertion of a transaction onto the bus. As can be seen, transactions are issued onto the bus only at the end of clock cycles 1, 5, 9, 12 and 15, wherein the state machine is either in the throttled or the free state. No transactions are issued at any of the other sampled points because the state machine is in the stalled state at those points in time.

What has been described is a bus system wherein each agent connected to the bus is capable of limiting the depth of a pipeline of the bus. Although described with respect to a particular exemplary embodiment, principles of the invention may be exploited in other embodiments and employed for different applications. The exemplary implementation described herein involves a multiprocessor computer system employing one or more microprocessors configured in accordance with Intel architecture. However, the principles of the invention may be exploited in other computer systems and environments as well. Accordingly, the embodiments described herein should be regarded as merely illustrative of the invention and should not be construed as limiting the scope of the invention.

What is claimed is:

1. A bus agent comprising:

means for transmitting pipelined bus transactions on a bus with a current pipeline depth varying up to a current maximum pipeline depth; and means for unilaterally and dynamically changing the current maximum pipeline depth.

2. A bus agent having a bus controller to transmit pipelined bus transactions on a bus with a current pipeline depth varying up to a current maximum pipeline depth and to unilaterally and dynamically change the current maximum pipeline depth.

3. A bus agent having a bus controller for transmitting pipelined bus transactions on a bus with a current pipeline depth varying up to a current maximum pipeline depth and for unilaterally and dynamically changing the current pipeline depth.

* * * * *